(12) United States Patent
Vestermark Vad

(10) Patent No.: US 10,016,808 B2
(45) Date of Patent: Jul. 10, 2018

(54) SEGMENTED CORE AND METHOD FOR MOLDING AN IMPELLER

(71) Applicant: GRUNDFOS HOLDING A/S, Bjerringbro (DK)

(72) Inventor: Martin Vestermark Vad, Randers NØ (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 256 days.

(21) Appl. No.: 14/768,277

(22) PCT Filed: Feb. 4, 2014

(86) PCT No.: PCT/EP2014/052142
§ 371 (c)(1),
(2) Date: Aug. 17, 2015

(87) PCT Pub. No.: WO2014/124837
PCT Pub. Date: Aug. 21, 2014

(65) Prior Publication Data
US 2015/0375294 A1 Dec. 31, 2015

(30) Foreign Application Priority Data

Feb. 18, 2013 (EP) .................................... 13155624

(51) Int. Cl.
*B22C 9/10* (2006.01)
*F04D 29/22* (2006.01)
(Continued)

(52) U.S. Cl.
CPC .............. *B22C 9/103* (2013.01); *B22F 3/225* (2013.01); *B22F 7/06* (2013.01); *B29C 33/0033* (2013.01);
(Continued)

(58) Field of Classification Search
CPC ...................................................... B22C 9/103
See application file for complete search history.

(56) References Cited

U.S. PATENT DOCUMENTS 4,231,413 A    11/1980  Bretzger
4,706,928 A *  11/1987  Hyll ........................ B29C 33/48
                                                    249/145

(Continued)

FOREIGN PATENT DOCUMENTS

EP          0 205 105 A1    12/1986
RU          2359778 C1       6/2009

*Primary Examiner* — Colleen P Dunn
*Assistant Examiner* — Rajinder Bajwa
(74) *Attorney, Agent, or Firm* — McGlew and Tuttle, P.C.

(57) ABSTRACT

A segmented core (1) for molding of an impeller (12), especially a pump impeller, includes at least three segments (2). All of the segments (2) have the same form and each segment (2) has connecting devices (3, 3') for connecting the segment (2) with the adjacent segments (2). A method for molding an impeller (12) includes the steps of: providing a molding tool (14), providing a core (1) including at least three identical segments (2), which include the connection portions (3, 3') for connecting the segment (2) with the adjacent segments (2); assembling of the core (1); placing the core (1) in the molding tool (14); molding the impeller (12), ejecting the core (1) and the impeller (12) out of the molding tool (14); and removing the core (1) from the impeller (12).

19 Claims, 3 Drawing Sheets

(51) Int. Cl.
*B22F 3/22* (2006.01)
*B22F 7/06* (2006.01)
*B29C 33/00* (2006.01)
*B29C 33/76* (2006.01)
*B29C 45/40* (2006.01)
*B29L 31/08* (2006.01)

(52) U.S. Cl.
CPC .............. *B29C 33/76* (2013.01); *B29C 45/40* (2013.01); *F04D 29/2222* (2013.01); *B29K 2859/00* (2013.01); *B29K 2905/06* (2013.01); *B29L 2031/08* (2013.01)

(56) References Cited

U.S. PATENT DOCUMENTS

| | | | |
|---|---|---|---|
| 5,591,466 A | 1/1997 | Bressler et al. | |
| 5,705,204 A | 1/1998 | Hofmeister et al. | |
| 2005/0119418 A1* | 6/2005 | Matsumoto | G02B 1/04 525/329.7 |
| 2009/0129961 A1* | 5/2009 | Lavoie | B22F 3/225 419/10 |
| 2011/0262282 A1 | 10/2011 | Vad et al. | |
| 2013/0011269 A1* | 1/2013 | Gainnozzi | B29C 45/14065 416/223 R |

\* cited by examiner

SEGMENTED CORE AND METHOD FOR MOLDING AN IMPELLER

CROSS REFERENCE TO RELATED APPLICATIONS

This application is a United States National Phase Application of International Application PCT/EP2014/052142 filed Feb. 4, 2014 and claims the benefit of priority under 35 U.S.C. § 119 of European Patent Application EP 13 155 624.3 filed Feb. 18, 2013, the entire contents of which are incorporated herein by reference.

FIELD OF THE INVENTION

The invention relates to a segmented core for molding of on impeller and a method for molding on impeller.

BACKGROUND OF THE INVENTION

In prior art, impellers ore used for a variety of applications. For example, impellers may be used as a rotating component in pumps as, e.g., centrifugal pumps, for transferring energy from a motor that drives the pump to a fluid being pumped. Usually, impellers are made from metal and are configured as short cylinders with an inlet for incoming fluid, vanes for pushing the fluid radially, and a bore to accept a drive shaft.

Small impellers nowadays are made from plastic material by injection molding. Impellers made of metal can be produced by casting or by welding metal sheets. Both methods are expensive.

An effective and economic process known from prior art to shape parts and components in a single operation and in a high volume is the so called metal injection molding (MIM) process according to which powdered metal is mixed with a binder material so that a feedstock is obtained which may be handled by plastic processing equipment by means of injection molding.

However, a problem with respect to the above described metal injection molding process is that complex three dimensional geometries may not be implemented.

SUMMARY OF THE INVENTION

Therefore, the present invention is based on the object to provide a segmented core to be used for molding an impeller, and a method for molding an impeller which allow an impeller to be mode by a MIM process and still allowing for a high design freedom to realize complex shapes.

According to the present invention, a segmented core for molding of an impeller, especially a pump impeller, is provided comprising at least three segments, all segments having the same form and each segment having connecting means (connecting devices comprised of connecting features as part of the segment shape) for connecting the segment with the adjacent segments. Specifically, by segmenting the core into connectable elements, it is possible to have free access to each side of each segment during the molding process. This is necessary for forming the impeller since it is technically impossible to mold the different three dimensional segments in one-piece. By providing a segmented core for molding on impeller, a complex geometry may be implemented and a great design freedom is thus provided.

According to a preferred embodiment, two segments border the room for a blade of the impeller in the mold.

According to a further preferred embodiment, the core has an inner ring and an outer ring.

Preferably, the inner and/or outer rings of the core are destined for positioning the core in the molding tool which allows an easy handling of the core during the molding process.

Further, it is advantageous, if the connection means of the segments are formed as self-locking parts of the inner and outer rings of the core. This also contributes to an easy handling and assembly of the core during the molding process.

The connection means of the segments may preferably be formed as snap-locking parts which allow for an easy and reliable connection of the segments.

Moreover, the segments may be nested and/or tensed up jointly.

According to a still further preferred embodiment, the segments are injection molded which is a very cost effective method and which, moreover, is suited for mass production.

The segments may consist of a thermoplastic polymer, in particular, of polyoxymethylene (POM).

According to the present invention, there is also provided a method for molding an impeller with the following steps: Providing a molding tool, providing a core consisting of at least three identical segments, which comprise connection means (connecting devices comprised of connecting features as part of the segment shape) for connecting the segment with the adjacent segments, assembling of the core and placing the core in the molding tool, molding the impeller, and ejecting core and impeller out of the molding tool, removing the core from the impeller. The inventive method allows for an impeller to be formed in a molding process with a complex three dimensional shape.

After the molding process the core may be chemically and/or thermally removed.

Preferably, the core segments are made by injection molding and especially by molding a thermoplastic polymer or a tin/bismuth alloy.

The impeller may be made by injection molding and especially metal injection molding (MIM) which process is well suited for mass production and which is very economical.

It is preferred that the impeller is baked-out, preferably sintered, after removing the core. This provides the desired properties for the thus finished impeller.

Also, it is possible to make the impeller by plastic injection molding and it would be finished after removing the core.

The above features and advantages of the present invention will become yet more apparent upon reading the following detailed description along with the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
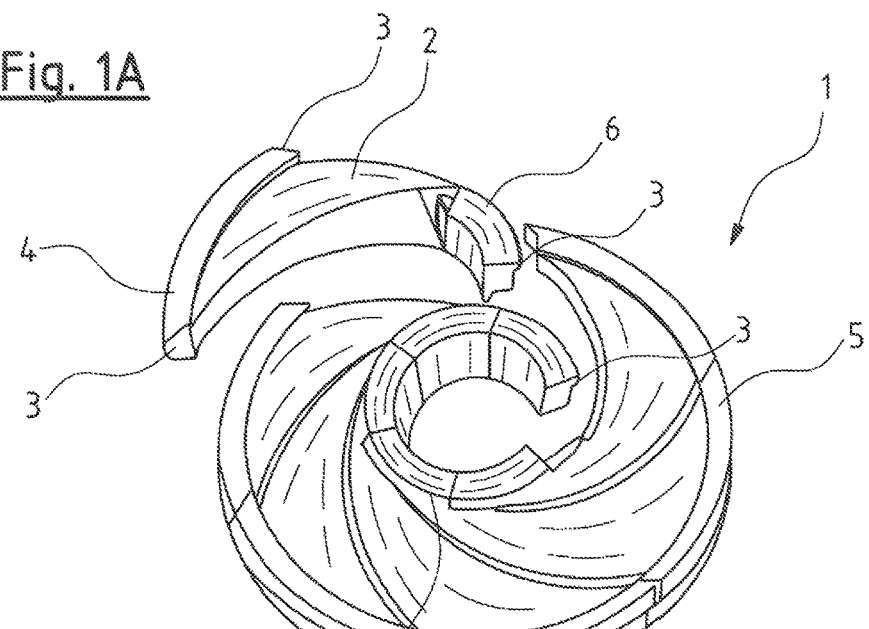
FIG. 1A is a perspective view of the segmented core according to an embodiment of the invention with one segment removed.
Figure 1B:
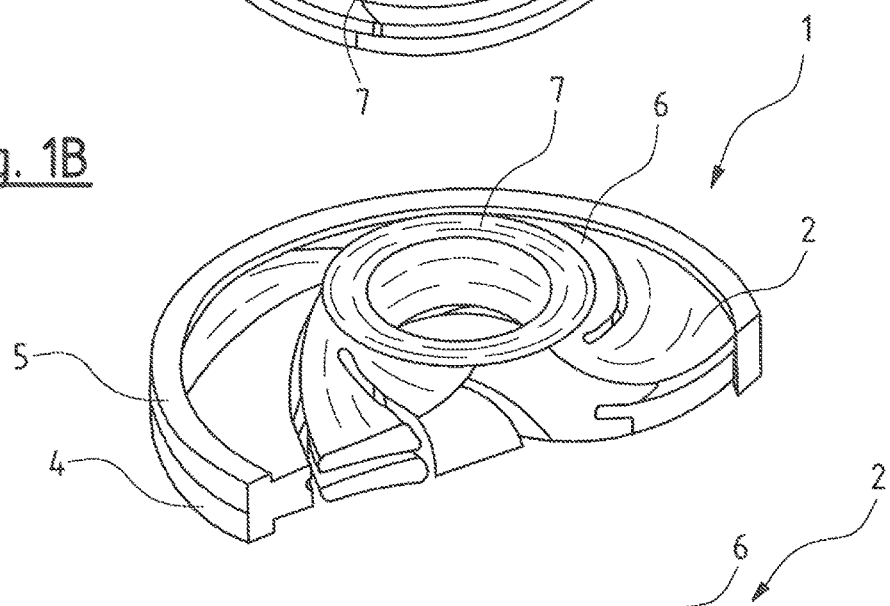
FIG. 1B is a perspective partial sectional view of the segmented core according to an embodiment of the invention.

FIGS. 1A and 1B are respective views of a segmented core 1 according to on embodiment of the invention. Specifically, FIG. 1A is a perspective view of the segmented core 1 with one segment 2 removed and FIG. 1B is a partial sectional view of the segmented core 1. As can be seen in FIG. 1A, the segmented core of the embodiment consists of six single segments 2 which are connected to each other by connecting means or connecting device 3. Specifically, there are respectively provided two first connecting means 3, arranged at on outer portion 4 of each segment 2, whereby the outer portions 4 of all segments 2 together form on outer ring 5, and there is respectively provided one second connecting means or connecting device 3' provided at on inner portion 6 of each segment 2 whereby the inner portions 6 of all segments 2 together form on inner ring 7. The connection means 3, 3' of the segments 2 are formed as self-locking parts of the inner and outer rings 5, 7 of the core 1. In the embodiment, the connection means 3, 3' of the segments 2 are formed as snap-locking parts. The inner ring 5 and the outer ring 7 of the core 1 are positioning aids for positioning the segments 2 of the core 1 in a molding tool. Further, each two adjacent segments 2 define and delimit the space for a blade of the impeller to be formed in a further process step in the mold by metal injection molding. The segments 2 are also injection molded and consist of a thermoplastic polymer, specifically, of polyoxymethylene (POM).

Figure 2:
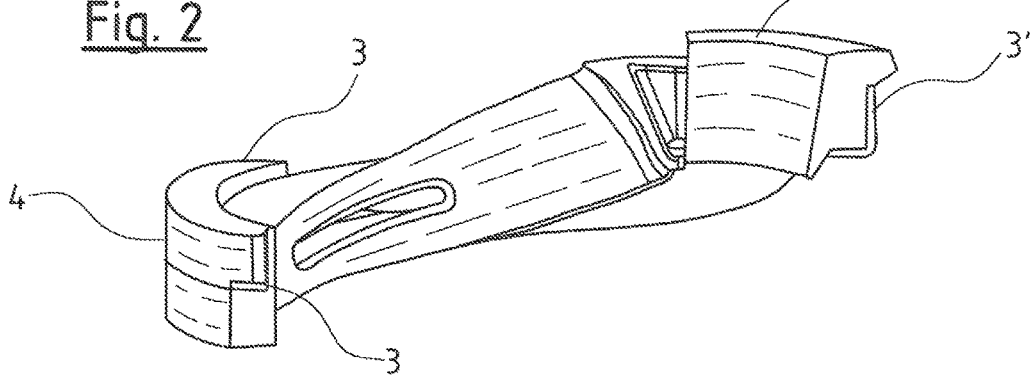
FIG. 2 is a perspective view of a single segment of the segmented core shown in FIGS. 1A and 1B.

FIG. 2 is a perspective view of a isolated single segment 2 of the segmented core 1 shown in FIGS. 1A and 1B. As can be seen in this enlarged view of the segment 2, each segment 2 comprises the two first connecting means 3 at the outer portion 4 and one connecting means 3' at the inner portion 6 which all are formed as self-locking means and are configured to engage with correspondingly formed connecting means 3, 3' or neighboring segments 2 when the core 1 is assembled.

Figure 3:
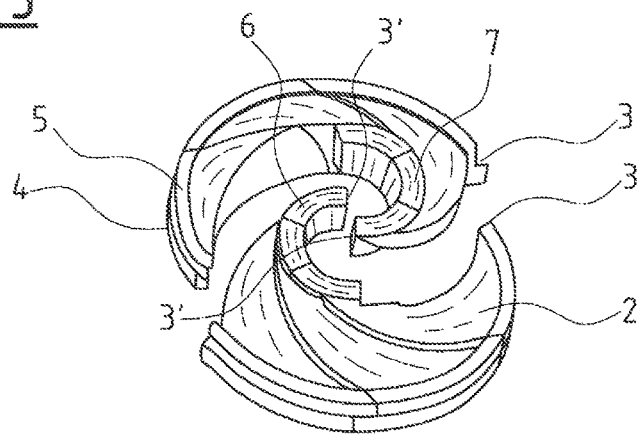
FIG. 3 is a perspective view of preassembled segments of the segmented core shown in FIGS. 1A and 1B.

FIG. 3 is a perspective view of preassembled segments 2 of the segmented core 1 shown in FIGS. 1A and 1B. As can be seen, in the assembling process of the core 1, which consists of six segments 2, in a first step, three segments 2 are preassembled by respectively connecting them via their respective connecting means 3, 3'. Then, in a second step, the two halves of the core 1, each consisting of three segments 2, will be assembled to form a complete core 1. For assembly of the two halves, each consisting of three segments 2, these halves are connected to each other by "sliding" them together. For assembly of the segments 2 and for handling the assembled segments 2 in insert molding, it is necessary that all of the segments 2 are self-locking.

Figure 4:
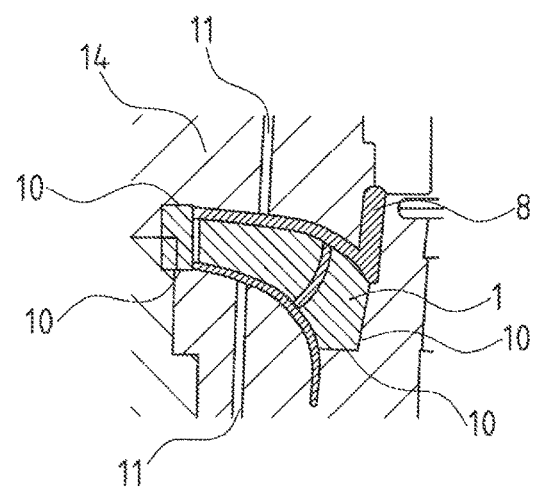
FIG. 4 is a sectional view of a port of the segmented core with MIM feedstock molded around the core in the molding tool.

FIG. 4 is a sectional view of a part of the segmented core 1 with MIM feedstock 8 molded around the core 1 in the molding tool 14. When placed in the molding tool 14, the segments 2 have been assembled as described above in connection with FIG. 3. After having been placed in the molding tool 14, the segmented core 2 acts as an inner molding part and the MIM feedstock 8 is molded on the outside of the core 1. The number of segments 2 of the core 1 represents the internal geometry of the impeller to be produced. As the number of segments 2 in the embodiment shown is six, the number of vanes or blades of the impeller to be produced will also be six. Further, as can be seen in FIG. 4, since it is essential that the segments 2 are sufficiently supported when loaded, there are provided supports 10. Also, larger segments 2 may have the tendency to deflect during insert molding as a function of the injection pressure and thermal influence from the feedstock 8. To prevent this, ejectors 11 are provided which help to support the segments 2 during injection and retract these during the holding time. For larger MIM ports, there could be a critical parameter in the difference in thermal expansion between the MIM feedstock 8 and the segments 2. This would eventually generate cracks during debinding due to the difference in thermal expansion. This can be avoided partially by heating the segments before the insert molding in order to compensate for this expansion.

Figure 5:
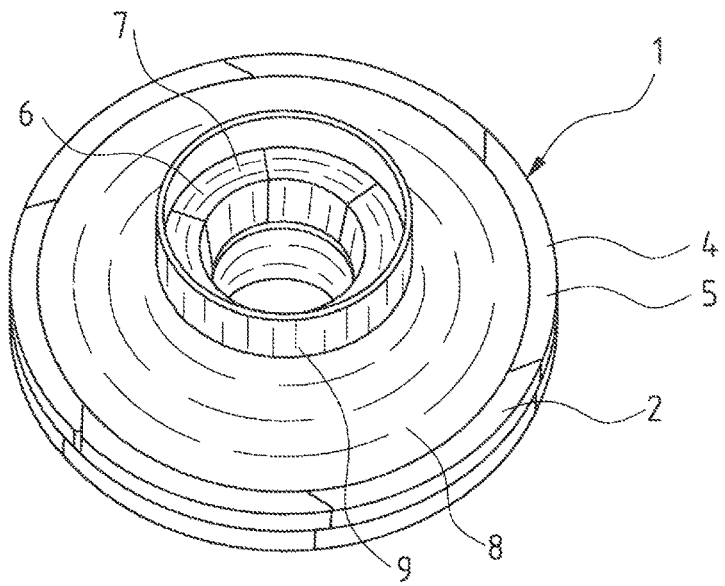
FIG. 5 is a perspective view of on MIM feedstock molded around the core without the molding tool.

FIG. 5 is a perspective view of a metal injection molded (MIM) feedstock 8 molded around the segmented core 1 without the molding tool. As can be seen, the feedstock 8 covers the segmented core 1 from the top and is engaged at its outer circumference by the outer ring 5 of the segmented core 1. Also, the inner ring 7 is fitted in an inner ring portion 9 of the feedstock 8. As mentioned above, the segments 2 of the core 1 are molded in POM which is the main component of the binder system of the MIM feedstock 8 and which is the component which will react with the $HNO_3$ in the de-binding process described below.

Figure 6A:
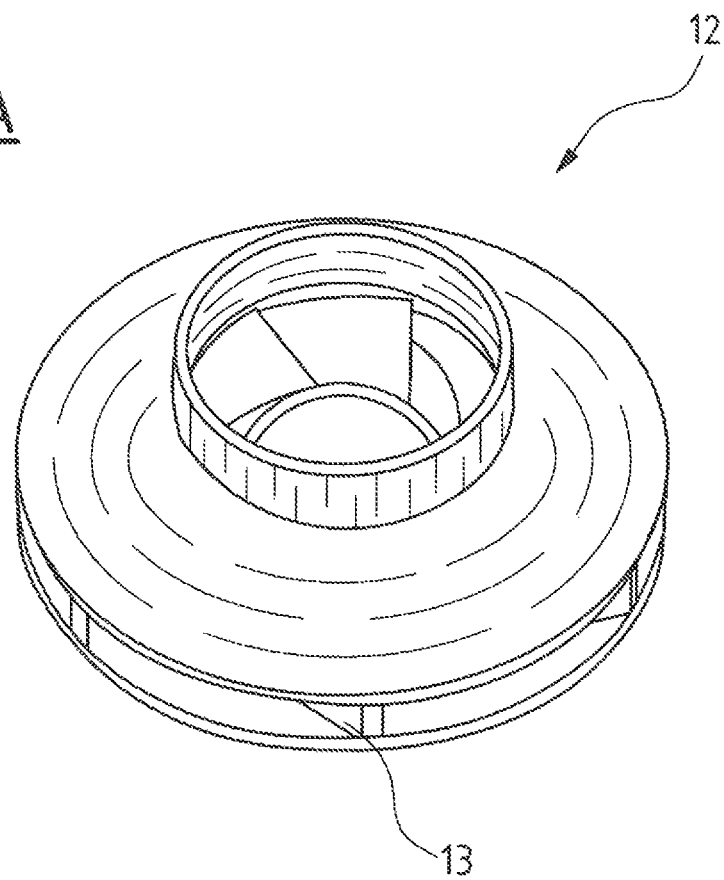
FIG. 6A is a perspective view of a finished impeller.
Figure 6B:
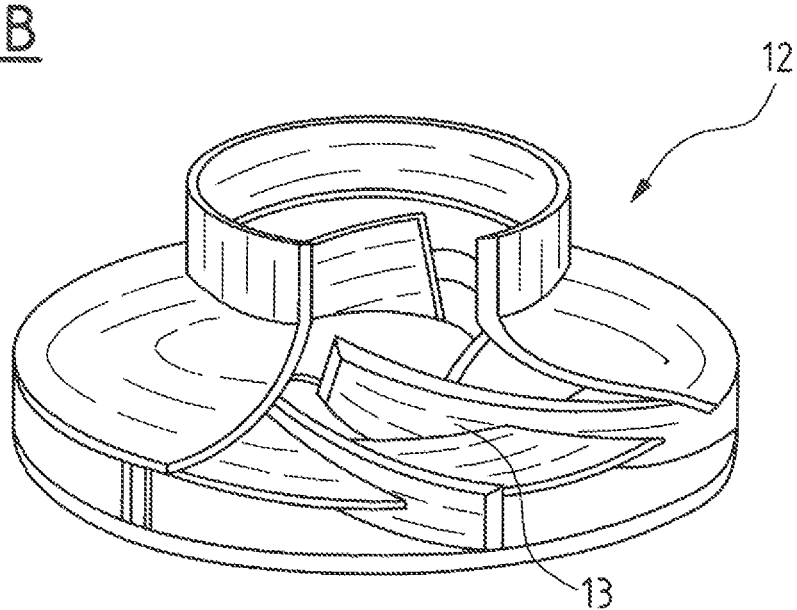
FIG. 6B is a partially cut away perspective view of the finished impeller

FIGS. 6A and 6B are respective views of a finished impeller 12 wherein FIG. 6A is a perspective view and FIG. 6B is another perspective view with a front part cut away so that the interior of the impeller 12 can be seen. Specifically, after the injection molding process has been completed, to obtain the finished impeller 12, the segments 2 of the segmented core 1 have been removed by a de-binding process which is a catalytic process in which the POM of the segments 2 reacts with $HNO_3$ whereby formaldehyde is created which can easily escape from the metal particles. The remaining feedstock then is subjected to a sintering process where after the finished impeller 12 is obtained. As can be seen in FIG. 5B, the interior of the impeller 12, in which the vanes or blades 13 are accommodated, has a complex geometry. Nevertheless, the entire impeller 12 is formed as one metal injection molded piece.

It is also possible to produce the impeller 12 by a traditional injection molding process using plastics. In this case, the inserted core 1 would normally be an alloy of Tin/Bismuth having a very low melting point. For releasing the core from the molded impeller 12, the latter would be placed in on oil both having a predetermined temperature so that the core would melt and leave the impeller 12 with its internal geometry created by the thus formed hollow spaces.

While specific embodiments of the invention have been shown and described in detail to illustrate the application of the principles of the invention, it will be understood that the invention may be embodied otherwise without departing from such principles.

The invention claimed is:

1. A method for molding an impeller the method comprising the steps of:
   providing a molding tool;
   providing a core comprising at least three identical segments, which each comprise connection means for connecting the segments with the adjacent segments, wherein the at least three identical segments are directly connected to each adjacent segment;

assembling of the core and placing the core in the molding tool;

molding the impeller;

ejecting core and impeller out of the molding tool;

removing the core from the impeller.

2. The method according to claim 1, wherein after the molding process the core is chemically and/or thermally removed.

3. The method according to claim 1, wherein the core segments are made by injection molding by molding a thermoplastic polymer or a tin/bismuth alloy.

4. The method according to claim 1, wherein the impeller is made by metal injection molding.

5. The method according to claim 4, wherein the impeller is baked-out, and sintered, after removing the core.

6. The method according to claim 1, wherein the impeller is made by plastic injection molding and the impeller is finished after removing of the core and after plastic injection molding.

7. The method according to claim 1, wherein each of the at least three identical segments has an upper surface and a lower surface, each of the upper surface and the lower surface extending continuously, without interruption, from one end of one of the at least three identical segments to another end of the one of the at least three identical segments.

8. A method for molding an impeller the method comprising the steps of:

providing a molding tool;

providing a core comprising at least three identical segments, which each comprise connection means for connecting the segment with the adjacent segments, wherein the at least three identical segments are directly connected together only by the connection means;

assembling the core and placing the core in the molding tool;

molding the impeller;

removing the core and the impeller from the molding tool;

removing the core from the impeller.

9. The method according to claim 8, wherein after the molding process the core is chemically and/or thermally removed.

10. The method according to claim 8, wherein the core segments are made by injection molding by molding a thermoplastic polymer or a tin/bismuth alloy.

11. The method according to claim 8, wherein the impeller is made by metal injection molding.

12. The method according to claim 11, wherein the impeller is baked-out, and sintered, after removing the core.

13. The method according to claim 8, wherein the impeller is made by plastic injection molding and the impeller is finished after removing of the core and after plastic injection molding.

14. The method according to claim 8, wherein each of the at least three identical segments has an upper surface and a lower surface, each of the upper surface and the lower surface extending continuously, without interruption, from one end of one of the at least three identical segments to another end of the one of the at least three identical segments.

15. A method for molding an impeller the method comprising the steps of:

providing a molding tool;

providing a core comprising at least a first core segment, a second core segment and a third core segment, the first core segment, the second core segment and the third core segment being identical to each other, the first core segment comprising a first core segment upper surface and a first core segment lower surface located opposite the first core segment upper surface, the first core segment upper surface and the first core segment lower surface extending continuously, without interruption, from one end of the first core segment to another end of the first core segment, the second core segment comprising a second core segment upper surface and a second core segment lower surface located opposite the second core segment upper surface, the second core segment upper surface and the second core segment lower surface extending continuously, without interruption, from one end of the second core segment to another end of the second core segment, the third core segment comprising a third core segment upper surface and a third core segment lower surface located opposite the third core segment upper surface, the third core segment upper surface and the third core segment lower surface extending continuously, without interruption, from one end of the third core segment to another end of the third core segment; wherein each of the first core segment, the second core segment and the third core segment comprises a connection means, wherein each of the first core segment, the second core segment and the third core segment is connected to an adjacent core segment exclusively by the connection means;

assembling the core and placing the core in the molding tool;

molding the impeller;

removing the core and impeller from the molding tool;

removing the core from the impeller.

16. The method according to claim 15, wherein the first core segment comprises a first core segment first connection means and a first core segment second connection means, the second core segment comprising a second core segment first connection means and a second core segment second connection means, the third core segment comprising a third core segment first connection means and a third core segment second connection means, wherein the first core segment, the second core segment and the third core segment are connected to each other exclusively by the first core segment first connection means, the first core segment second connection means, the second core segment first connection means, the second core segment second connection means, the third core segment first connection means and the third core segment second connection means.

17. The method according to claim 15, wherein after the molding process the core is chemically and/or thermally removed.

18. The method according to claim 15, wherein the core segments are made by injection molding by molding a thermoplastic polymer or a tin/bismuth alloy.

19. The method according to claim 15, wherein the impeller is made by plastic injection molding and the impeller is finished after removing of the core and after plastic injection molding.

* * * * *